US008949938B2

(12) United States Patent
Sowatskey et al.

(10) Patent No.: US 8,949,938 B2
(45) Date of Patent: Feb. 3, 2015

(54) MECHANISMS TO USE NETWORK SESSION IDENTIFIERS FOR SOFTWARE-AS-A-SERVICE AUTHENTICATION

(75) Inventors: Nathan Sowatskey, Madrid (ES); Nancy Cam-Winget, Mountain View, CA (US); Susan E. Thomson, Summit, NJ (US); David Jones, Alameda, CA (US); Morteza Ansari, Newark, CA (US); Klaas Wierenga, Utrecht (NL); Joseph Salowey, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 13/282,875

(22) Filed: Oct. 27, 2011

(65) Prior Publication Data

US 2013/0111549 A1 May 2, 2013

(51) Int. Cl.
*G06F 7/04* (2006.01)
*H04L 29/06* (2006.01)
(52) U.S. Cl.
CPC ..................................... *H04L 63/08* (2013.01)
USPC ...... 726/3; 726/2; 726/27; 713/155; 713/168; 709/22
(58) Field of Classification Search
CPC ............... H04Q 3/0016; H04Q 3/0029; G06F 17/30067; H04L 63/08
See application file for complete search history.

(56) References Cited

U.S. PATENT DOCUMENTS

| | | | |
|---|---|---|---|
| 6,336,115 B1 * | 1/2002 | Tominaga et al. | .................... 1/1 |
| 7,246,230 B2 | 7/2007 | Stanko | |
| 8,006,282 B2 * | 8/2011 | Sankaran et al. | .................. 726/2 |
| 8,024,080 B2 | 9/2011 | Greene et al. | |
| 8,484,241 B2 | 7/2013 | Bouse et al. | |
| 2004/0193635 A1 * | 9/2004 | Hsu et al. | ...................... 707/102 |

(Continued)

FOREIGN PATENT DOCUMENTS

| | | |
|---|---|---|
| WO | 2006045402 A1 | 5/2006 |
| WO | 2010000298 A1 | 1/2010 |
| WO | 2011031272 A1 | 3/2011 |

OTHER PUBLICATIONS

Cisco, "Cisco Software-as-a-Service (SaaS) Access Control", White Paper, 2010, p. 1-7.

(Continued)

*Primary Examiner* — Fatoumata Traore
*Assistant Examiner* — Khoi Le
(74) *Attorney, Agent, or Firm* — Edell, Shapiro & Finnan, LLC (57) ABSTRACT

Techniques are provided for authenticating a subject of a client device to access a software-as-a-service (SaaS) server. A network access device receives a request from a client device to establish a network session and transfers identity information of the subject, the client device and the network session to a session directory database. A request is sent to access an application on a SaaS server. If it does not contain an identity assertion that identifies the subject, the request is redirected to an identity provider device (IdP), to provide identity assertion services to the subject. A network session identifier is inserted into the request by a network access device and the request is forwarded to the IdP. The IdP uses the network session identifier to query the session directory database for the identity information to be used for a security assertion of the subject to the SaaS server.

19 Claims, 8 Drawing Sheets

(56) References Cited

U.S. PATENT DOCUMENTS

| | | | |
|---|---|---|---|
| 2005/0135625 A1 | 6/2005 | Tanizawa et al. | |
| 2006/0021004 A1 | 1/2006 | Moran et al. | |
| 2006/0129817 A1 | 6/2006 | Borneman et al. | |
| 2006/0236382 A1* | 10/2006 | Hinton et al. | 726/8 |
| 2007/0271598 A1 | 11/2007 | Chen et al. | |
| 2008/0127320 A1 | 5/2008 | De Lutiis et al. | |
| 2008/0184354 A1* | 7/2008 | Yamazaki | 726/8 |
| 2009/0126007 A1 | 5/2009 | Zamberlan et al. | |
| 2009/0178109 A1 | 7/2009 | Nice et al. | |
| 2009/0249439 A1* | 10/2009 | Olden et al. | 726/1 |
| 2009/0249440 A1 | 10/2009 | Platt et al. | |
| 2009/0307750 A1* | 12/2009 | Marueli et al. | 726/3 |
| 2010/0242105 A1* | 9/2010 | Harris et al. | 726/12 |
| 2011/0153854 A1* | 6/2011 | Chickering | 709/229 |
| 2011/0154443 A1* | 6/2011 | Thakur et al. | 726/3 |
| 2011/0162055 A1 | 6/2011 | Hinton et al. | |
| 2011/0179478 A1 | 7/2011 | Flick | |
| 2011/0265155 A1* | 10/2011 | Liu | 726/5 |
| 2012/0054625 A1* | 3/2012 | Pugh et al. | 715/736 |
| 2012/0096271 A1 | 4/2012 | Ramarathinam et al. | |
| 2012/0144034 A1 | 6/2012 | McCarty | |
| 2012/0216268 A1 | 8/2012 | Kassaei et al. | |
| 2012/0278487 A1 | 11/2012 | Woelfel | |
| 2012/0278872 A1 | 11/2012 | Woelfel et al. | |
| 2013/0007867 A1 | 1/2013 | Sowatskey et al. | |
| 2013/0139241 A1 | 5/2013 | Leeder | |
| 2013/0227099 A1 | 8/2013 | Hinton et al. | |
| 2013/0297700 A1 | 11/2013 | Hayton et al. | |
| 2014/0047532 A1 | 2/2014 | Sowatskey | |

OTHER PUBLICATIONS

John Hughes et al., "Profiles for the OASIS Security Assertion Markup Language (SAML) V2.0," OASIS Standard, Mar. 15, 2005, OASIS Open 2005, 66 pages.

Lewis, et al., "Web Single Sign-On Authentication Using SAML," IJCSI International Journal of Computer Science Issues, vol. 2, Sep. 2009, pp. 41-48.

Al-Sinani, et al., "A Universal Client-Based Identity Management Tool," Public Key Infastructures, Services and Applications, Springer Berlin Heidelberg, Sep. 2011, pp. 49-74.

Wikipedia, "Security Assertion Markup Language", Obtained May 2014, http://en.wikipedia.org/wiki/Security_Assertion_Markup_Language, 11 pages.

* cited by examiner

MECHANISMS TO USE NETWORK SESSION IDENTIFIERS FOR SOFTWARE-AS-A-SERVICE AUTHENTICATION

TECHNICAL FIELD

The present disclosure relates to authenticating a subject, identified by a principal, for network access to software services provided by a server.

BACKGROUND

Software-as-a-service (SaaS) is a software distribution model where applications hosted by remote servers are accessed by client subjects over a network. In order to access the SaaS applications, the client identity may need to be asserted to a SaaS application server. SaaS server authentication is subject to issues of managing online client identities and the ability to manage corporate access to SaaS systems. The subject, for example, may authenticate with a network device (e.g., laptop, personal computer, internet protocol phone, etc.), which establishes an authenticated session with a network, and may also authenticate to the SaaS application separately. An Identity Provider can reduce the cost and complexity of managing identity and access for multiple SaaS providers. In general, an identity provider asserts the identity of a subject obtained using a form-based authentication within the consuming enterprise.

DESCRIPTION OF EXAMPLE EMBODIMENTS

Overview

Techniques are provided for asserting a principal of a subject for access to a software-as-a-service (SaaS) server using the principals and credentials presented when the network session subject dynamically negotiates network access. A request is received at a network access device from a client device to establish a network session. Identity information of the client device is sent from the network access device to a session directory database that is configured to store identity information of a plurality of client devices associated with network session identifiers from the network access device. A request is received from the client device to access an identity provider device that provides identity assertion services to the client device. A network session identifier is inserted into the request from the client device to access the identity provider device. The network session identifier is a unique identifier that identifies the session. The request with the inserted network session identifier is forwarded to the identity provider device. The identity provider device receives the request from the network access device originating from a client device to access the identity provider device. A network session identifier is extracted from the request. The network session identifier is unique to the network. A session directory database is then queried to obtain information associated with the network session identifier. The information is received from the session directory database, a security assertion using the information is generated associated with the network session identifier, and the security assertion is sent to the client device.

Example Embodiments

Figure 1:
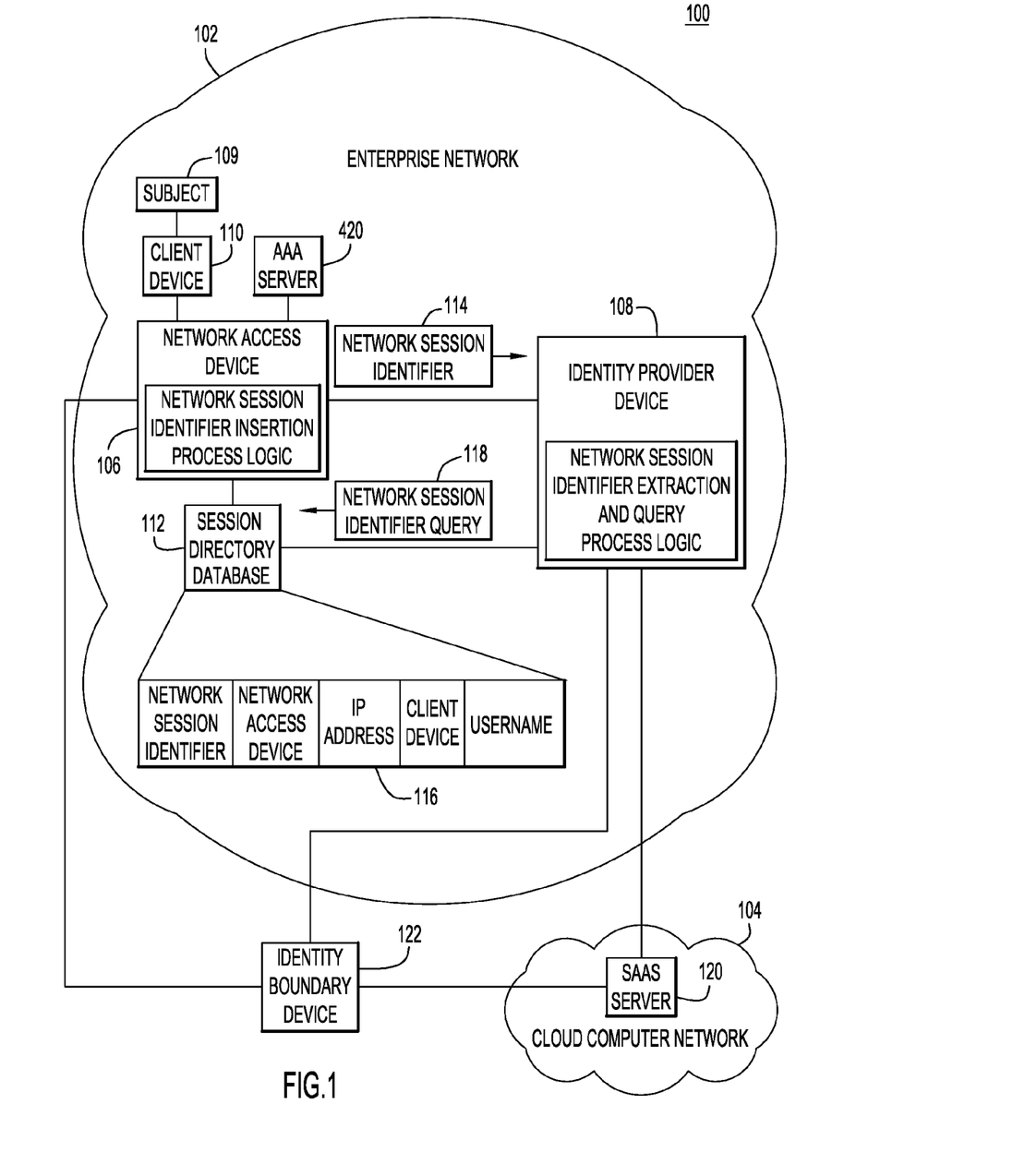
FIG. 1 shows an example network topology that supports access to applications provided by a software-as-a-service (SaaS) server by a subject using the identity authenticated during network session initialization as a principal in the identity assertion from the Identity Provider.

FIG. 1 shows an example network topology 100 featuring an enterprise network 102 and a cloud computing network 104. The enterprise network 102 comprises a network access device 106, an identity provider device 108, a subject 109, a client device 110, an Authentication, Authorization and Accounting (AAA) server 420, and a session directory database 112. The subject 109 may be a network user or a logical entity in the software of the client device 110, that interacts with, or communicates via, the client device 110 (e.g., a client device such as a computer, laptop, mobile device, tablet device, etc.) to access a SaaS server 120 in the cloud computing network 104. The subject 109 is identified by principals. The veracity of the principals for the subject 109 is established by credential data provided, for example, in a protocol specific way to the network access device 106 by the client device 110 described herein.

Upon initial connection to the network access device 106 by the client device 110, the network access device 106 may communicate the network session identifier 114, and any network session context data known at that time, to the session directory database 112 so that an initial record of the network session and corresponding context data may be established. The record established in the network session database 112 may be updated with further identity data provided during the authentication phase of network session initialization as described herein. In one example, the identifier information may comprise the type of the client device 110, information available about software running on the client device 110, location of the client device 110 and network access device 106 and network access request information including the type and time of the network connection from the client device 110. This information may generally be referred to as the context of the network session, and is associated with the identity data provided during the authentication process as described herein.

The network access device 106 is configured to communicate with the AAA server 420 to authenticate the principals of the subject 109, using the credential data provided, in order to determine whether the client device 110 may establish a network session. For example, as described in more detail herein, the network access device 106 is configured to receive requests from the subject 109 (via, e.g., the client device 110) to join the network 100. For example, the subject 109, through client device 110, may try to dynamically negotiate a network connection with the network access device 106 to join the network 100. Authentication credentials of the subject 109 may be verified by the network access device 106, according to the techniques described herein. Upon successful authentication, where AAA server 420 has used the credential data supplied from the client device 110, via the network access device 106, to validate the principals of the subject 109, supplied from the client device 110 via the network access device 106, the AAA server 420 may communicate with the network session database 112 using the network session identifier 114 to update or create a record in the session directory database 112 that associates the network session identifier 114 with the identity and context data for the subject and network session.

In one example, the network session identifier 114 comprises a random or pseudorandom number that is unique to the network 100. In one example, the network session identifier 114 may be unique to the network access device 106. In this example, the network session identifier 114 can be used to identify the network session for subjects (e.g., subject 109) that have authenticated with the network access device 106 (via, e.g., client device 110), and information pertaining to these subjects, (e.g. principals and context data) can be obtained from the session directory 112 by a requesting network device, such as the identity provider device 108. In other words, network devices that are aware of the network session identifier 114 can use the network session identifier 114 as a key to obtain information (e.g., from the session directory database 112) about authenticated subjects, and the context of their network session, associated with the client device 110 that has established a network session with the network access device 106.

The network session identifier 114 is inserted into the request from the network access device 106 to the AAA server 420. The AAA server 420, after authenticating the subject's principal at an enterprise directory, includes the network session identifier 114 in its update to the session directory database 112. This allows the session directory database 112 to associate the principal authenticated with the subject 109 with the network session identifier 114 for the network session of the subject 109 established via the client device 110.

The subject 109, using the client device 110, makes a request to a SaaS application on the SaaS server 120. The request is intercepted by the identity boundary device 122 and redirected to the identity provider device 108 in a protocol specific manner such that the request to the identity provider device 108 comes from the client device 110 and that the original destination of the request is encoded in the redirected request.

The redirected request to the identity provider device 108 is intercepted by the network access device 106 and the network session identifier 114 is appended to the request in a protocol specific manner. The identity provider device 108 receives the request from the network access device 106 and extracts the network session identifier 114 from the request. The session directory database 112 is queried by the identity provider device, using the appended network session identifier, to obtain identity and context information associated with the network session identifier, in particular the principal of the subject provided when establishing the network session and other identity information associated with that principal.

An identity assertion is generated by the identity provider device 108 using the identity and context information associated with the network session identifier 114. The identity information in the identity assertion may include any identity and context information associated with the subject 109 for the network session and the network session itself, not limited to, nor necessarily including, the principals provided when the network session was established for the subject 109. The identity assertion is included in a response from the identity provider device 108 to the client device 110, in a protocol specific way, which causes the client device 110 to make a new request, containing the identity assertion, to the SaaS server 120. The SaaS server 120 receives a request from the client device 110 that contains an identity assertion based on the identity associated with the subject of the network session. The subject 109 does not, then, need to provide such identity data directly to the SaaS server 120, or the identity provider, once the network session for the subject has been established with a authenticated principals. These techniques are described herein.

An identity assertion is generated by the identity provider device 108 using the identity and context information associated with the network session identifier 114. The identity information in the identity assertion may include any identity and context information associated with the subject 109 for the network session and the network session itself, not limited to, nor necessarily including, the principals provided when the network session was established for the subject 109. The identity assertion is included in a response from the identity provider device 108 to the identity boundary device 122 which inserts the identity assertion into the request which originated from the client device 110 and forwards it to the SaaS application on the SaaS server 120.

It should be appreciated that though authentication services may be provided to the client device (e.g., client device 110), the identity that is being authenticated by the network access device 106 is that of the subject 109, which may be the user of the client device 110. In another example, there may be situations where the client device 110 does not have a user as such (e.g., when the client device is an application server accessing a SaaS web service by dynamically negotiating network connectivity), and in that situation, the identity that is being authenticated by the network access device 106 is that of the client device 110 and so the subject whose principals are being authenticated is a logical entity associated with, for example, the operating system software of the client device.

The network session identifier 114, for example, may comprise an Internet Protocol (IP) address and/or media access control (MAC) address and a principal name for each subject/client device. The session directory database 112 may comprise multiple data entries associated with the network session identifier 114. For example, as shown in reference numeral 116, the session directory database 112 may maintain a mapping between multiple network session identifiers and corresponding network access devices. Additionally, the session directory database 112 may map the network access devices to Internet Protocol (IP) addresses associated with client devices of subjects that have authenticated with the network access devices, as well as identity information for the subjects themselves (such as subject principals, device type, connection type, device software and other context data about the client device 110 and the network session).

When the subject 109 joins enterprise network 102 (e.g., via client device 110), the network access device 106 stores the network session identifier 114 in the session directory database 112 and also stores other information relating to the client device 110 (e.g., IP address, MAC address, operating system type, device type etc.) and subject 109 (e.g., subject principals, etc.). A network device seeking information about the subject 109 or the client device 110 can obtain the information stored in the session directory database 112 as long as the querying device has the network session identifier 114 information to use as a key. For simplicity, FIG. 1 shows a single network access device 106 in communication with a single client device 110, though it should be appreciated that multiple network access devices could communicate with multiple client devices.

It should be appreciated that the session directory database 112 is configured to store any network identifier associated with the network access device 106, and that the network session identifier 114 is an example. The network session identifier 114 should have the property such that, when stored in the session directory 112, it can be used to uniquely identify a given network session on a given network access device at least within the context of the network 100. Additionally, any identifier that has this property that can be appended as a parameter or included in a header or otherwise associated with a message of a network protocol, for example, a hypertext transfer protocol (HTTP), and be extracted from the protocol message and used by the identity provider device 108 to look up identity information in the session directory database 112 may be used as a network identifier, as described herein. It should also be appreciated that the techniques described herein are not limited to HTTP, and that other protocols, e.g., an Extensible Messaging and Presence Protocol (XMPP), could be used to carry the network identifier information.

The network access device 106 may be any device that implements a set of control protocols to enable access for a subject (e.g., subject 109 via client device 110) to a network. For example, as described herein, the network access device 106 may implement policies or protocols to insert or append network identifier information to network protocol messages initiated by the subject 109, via client device 110, to access network resources. In one example, described in more detail herein, in response to receiving a message from the subject 109 via the client device 110 to access the SaaS server 120, the network access device 106 may add the network session identifier 114 to the message so that the identity provider device 108 can extract the network session identifier and use it to look up identity and context information of the subject 109 and the client device 110.

The network access device 106 is configured to communicate with the identity provider device 108 as described above, and is also configured to communicate with the session directory database 112. For example, as described in more detail herein, when the identity provider device 108 receives the network session identifier 114 from the network access device 106, the identity provider device 108 can send a query (e.g., a network session identifier query 118) to the session directory database 112 to retrieve information associated with the network session identifier 114. Thus, by receiving the network session identifier 114 from the network access device 106, the identity provider device 108 is provided with a key that can be utilized to obtain from the session directory database 112 information associated with corresponding network access devices (e.g., network access device 106), subjects (e.g., subject 109) and client devices (e.g., client device 110) that have authenticated with the network access devices.

After receiving this information, the identity provider device 108 can assert the identity of the subject 109 of the client device 110 by providing, for example, a signed assertion to the SaaS server 120, as described herein.

The cloud computing network 104 comprises a software-as-a-service (SaaS) server 120, which may be configured to host applications (e.g., email, networking, word processing, audio/video, etc.) and may store information (e.g., software management information, network security information, remote data backup, etc.), accessible by network clients that send messages containing assertions of identity, for example assertions created by the identity provider device 108, to the SaaS server 120. It should be appreciated, however, that though FIG. 1 shows cloud computing network 104 as a SaaS network, other cloud computing networks (e.g., infrastructure-as-a-service (IaaS), platform-as-a-service (PaaS), cloud client network, etc.) may be represented by cloud computing network 104. Cloud computing network 104 may be owned or operated by the same entity that owns or operates the enterprise network 102 or may be a network independent of enterprise network 102. For example, cloud computing network 104 may be a private network in a datacenter that is owned and operated by enterprise network 102 or by a third party.

The client device 110 of the enterprise network 102 is configured to communicate with the SaaS server 120 of the cloud computing network 102. It should be appreciated that the client device 110 may communicate with the identity boundary device 122, via the network access device 106, as part of a network protocol message exchange in order to add the identity assertions required to access to the SaaS server 120 (e.g., the message protocol might be HTTP, and the identity assertions might be the Security Assertion Markup Language (SAML)). The identity boundary device 122 may be any device (e.g., an edge device) that is configured to serve as an entry access point to the cloud computing network 104, to receive, for example, access requests from the subject 109 via the client device 110 and to either send these requests to the SaaS server 120, or to recognize which of the requests require redirection to the identity provider device for the addition of an identity assertion.

The identity boundary device 122 communicates with the SaaS server 120, which in turn, can communicate directly or indirectly with the identity provider device 108, for example, to verify or confirm authentication of the subject 109 of the client device 110, by receipt of an assertion or authentication information associated with the subject 109 of the client device 110, as described herein. The SaaS server 120 communicates indirectly with the identity provider device 108 by requests that are redirected by the identity boundary device 122 to the identity provider device 108 via the client device 110 and the network access device 106. It should be appreciated that the SaaS server 120 may communicate directly with the identity provider device 108 based on information in identity assertions added to requests during indirect communication.

Figure 2:
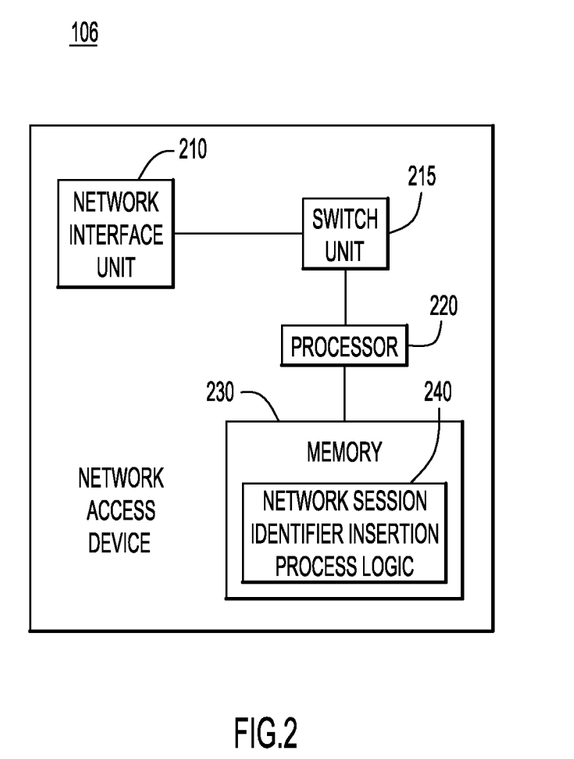
FIG. 2 is an example block diagram of a network access device configured with network session identifier insertion process logic to provide network session information during the process of utilizing authentication services for the subject.

Reference is now made to FIG. 2, which depicts an example block diagram of the network access device 106. The network access device 106 comprises a network interface unit 210, a switch unit 215, a processor 220 and a memory 230. The network interface unit 210 is configured to enable network communications, for example, to receive access requests from the subject 109 via the client device 110 and to send the network session identifier 114 associated with the network access device 106 to the session directory 112. The switch unit 215 is coupled to the network interface unit 210 and is configured to enable the network access device 106 to forward packets (e.g., requests) received from one or more devices in network 100 to an appropriate destination device. For example, switch unit 215 enables requests received from the subject 109 of the client device 110 and destined for the identity provider device 108 to be forwarded to the identity provider device 108, or for requests to the SaaS Server 120 to be forwarded to the SaaS Server 120.

The processor 220 is coupled to the switch unit 215 and to memory 230. The processor 220 is a microprocessor or microcontroller that is configured to execute program logic instructions (i.e., software) for carrying out various operations and tasks described herein. For example, processor 220 is configured to execute network session identifier insertion process logic 240 that is stored in memory 230 to insert network session identifier information associated with the network access device 106 in requests from the subject 109 of the client device 110 to access the identity provider device 108. Memory 230 may comprise read only memory (ROM), random access memory (RAM), magnetic disk storage media devices, optical storage media devices, flash memory devices, electrical, optical or other physical/tangible memory storage devices.

The functions of processor 220 may be implemented by logic encoded in one or more tangible computer readable storage media (e.g., embedded logic such as an application specific integrated circuit, digital signal processor instructions, software that is executed by a processor, etc), wherein memory 230 stores data used for the operations described herein and stores software or processor executable instructions that are executed to carry out the operations described herein.

The network session identifier insertion process logic 240 may take any of a variety of forms, so as to be encoded in one or more tangible computer readable memory media or storage device for execution, such as fixed logic or programmable logic (e.g., software/computer instructions executed by a processor) and the processor 220 may be an application specific integrated circuit (ASIC) that comprises fixed digital logic, or a combination thereof. For example, the processor 220 may be embodied by digital logic gates in a fixed or programmable digital logic integrated circuit, which digital logic gates are configured to perform the network session identifier insertion process logic 240. In general, the network session identifier insertion process logic 240 may be embodied in one or more computer readable storage media encoded with software comprising computer executable instructions and when the software is executed operable to perform the operations described herein for the process logic 240.

Figure 3:
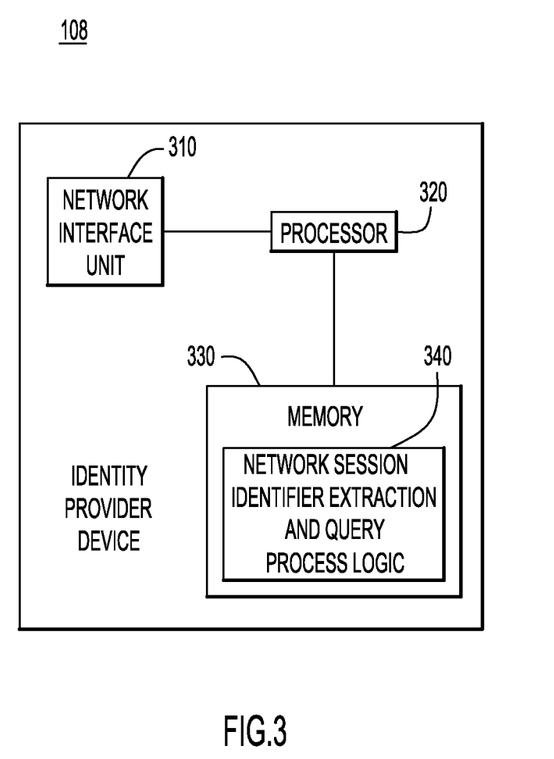
FIG. 3 is an example block diagram of an identity provider device configured with network session identifier extraction and query process logic to obtain authentication information, in particular, but not exclusively, of the principal of the network session subject associated with the network session identifier information.

Turning to FIG. 3, an example block diagram of the identity provider device 108 is shown. The identity provider device 108 comprises a network interface unit 310, a processor 320 and a memory 330. The network interface unit 310 of the identity provider device 108 is configured to enable communications with the network access device 106, for example, to receive the network session identifier 114 associated with the network access device 106 and is configured to enable communications with the session directory database 112, for example, to send the network session identifier query 118 to retrieve authentication, identity and context information associated with the subject 109 of the client device 110. The network interface unit 310 is also configured to enable communications with the SaaS server 120.

The processor 320 is coupled to the network interface unit 310 and to the memory 330. Processor 320 is a microprocessor or microcontroller that is configured to execute program logic instructions (i.e., software) for carrying out various operations and tasks described herein. For example, processor 320 is configured to execute network session identifier extraction and query process logic 340 that is stored in memory 330 to verify authentication of the subject 109 of the client device 110. Memory 330 may comprise read ROM, RAM, magnetic disk storage media devices, optical storage media devices, flash memory devices, electrical, optical or other physical/tangible memory storage devices.

The processor 320 and the network session identifier extraction and query process logic 340 may take any of the variety of forms similar to those described above for processor 220 and process logic 240, respectively.

In general, when the subject 109 of the client device 110 requests the network access device 106 to join the enterprise network 102, the network access device 106 authenticates the subject 109 of the client device 110, and upon authentication, stores information associated with the subject 109 of the client device 110, information associated with the client device 110, and information associated with the network session, in the session directory database 112. The network 100 has a unique network identifier assigned to it (e.g., network session identifier 114), and a mapping is maintained in the session directory database 112 between the network identifier assigned to the network access device 106 and the information associated with the subject 109 of the client device 110 that has joined the enterprise network 102. After the subject 109 of the client device 110 has been authenticated, the subject 109 of the client device 110 may request access to services hosted by the SaaS server 120 of the cloud computing network 104. For example, the subject 109 of a personal computer serving as the client device 110 may wish to log-in to application services hosted by service provider (e.g., SaaS server 120).

When the subject 109 makes the request (e.g., via the client device 110) to access the SaaS server 120, the identity boundary device 122, by virtue of residing in a data path between the client device 110 and the SaaS server 120, intercepts the request and redirects the request to the network access device 106 and the identity provider 108 so that the identity and context associated with the subject 109, the client device 110 and the network session can be used as the content of an assertion of identity. The network access device 106 provides the identity provider device 108 with a network identifier (e.g., network session identifier 114) associated with the network access device 106, and the identity provider device 108 uses the network identifier to query the session directory database 112 for information associated with the subject 109, the client device 110 and the network session. The identity provider device 108 returns an identity assertion to the client device 110 associated with the subject 109 (via, e.g., the network access device 106). The subject 109 is then able to request, via the client device 110, access to the SaaS server 120 with the identity assertion provided by the identity provider device. It should be appreciated that the request from the subject 109 via the client device 110 with the identity assertion may be automated and executed in a way that is not apparent to the subject 109 and does not require any manual intervention. Thus, the subject 109 is able to access the SaaS server 120 client device 110 by obtaining appropriate authentication and access credentials from the network access device 106 and identity provider device 108 without having knowledge of the network identifier information utilized by the identity provider device 108 to verify the authentication of the subject 109 of the client device 110. These techniques are described in more detail below.

In order to provide the proper authentication credentials (e.g., a signed assertion of authentication), the identity provider device 108 needs to look up information associated with the identity of the subject 109 of the client device 110 making the request. Thus, the identity provider device 108 needs to perform this look up in such a way as to ensure that the network identifier information may not be revealed to the client device 110 (or subject 109).

It is desirable that the network identifier information is not revealed to the client device 110 or the subject 109. In other words, the network identifier information (e.g., the network session identifier 114) needs to be protected from modification by the client device 110 or the subject 109. The network access device 106 needs to ensure that the correct network identifier information for the client device 110 is inserted into messages. The network identifier information should be protected from disclosure to unauthorized parties, such as the client device 110, to prevent it from being used by an attacker to gain additional privileges in the system. For example, it would not be desirable for the identity provider device 108 to use identifier information such as an IP address associated with the client device 110 to perform the look up, since the IP address can easily be "spoofed" by an unauthorized party. Furthermore, the use of IP addresses is not desirable since, if there are any network address translations (NAT) between the network access device 106 and the identity provider device 108, the original IP addresses associated with the client device 110 would be unavailable to the identity provider device 108. Instead, by utilizing more secure identifier information for the lookup (e.g., the network session identifier 114 provided by the network access device 106), the identity provider device 108 can more securely verify that only client devices associated with authenticated subjects will receive the proper authentication credentials to access the SaaS server 120. Also, to further protect against unauthorized access, the network session identifier information is not available to the client device 110. The client device 110 merely receives the signed assertion of authentication from the identity provider device 108, and it never has knowledge of the network session identifier 114.

Figure 4A:
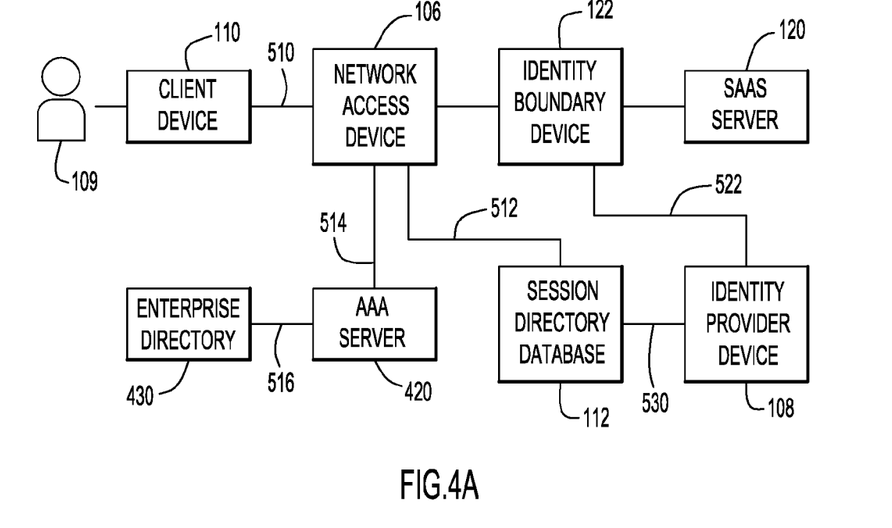
FIGS. 4A and 4B are diagrams showing the entities involved in the process for client access and authentication for applications provided by the SaaS server.
Figure 4B:
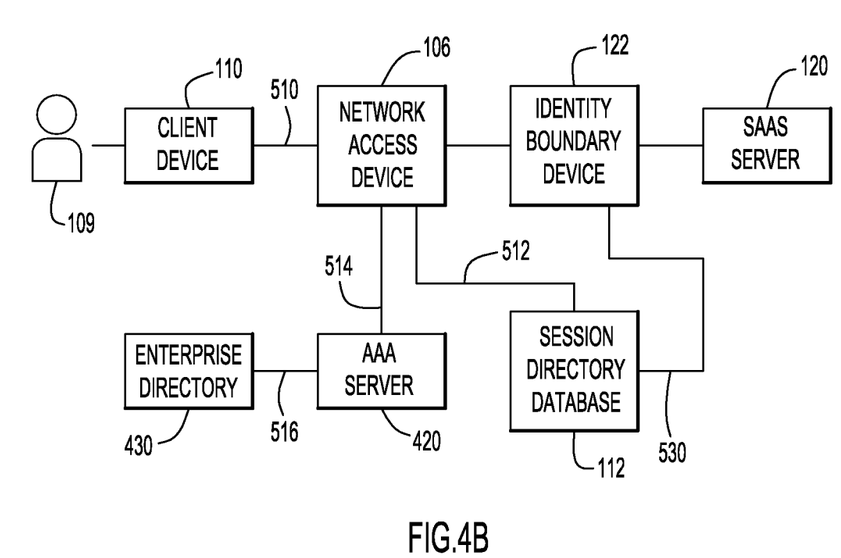

Reference is now made to FIGS. 4A and 4B. FIGS. 4A and 4B show an example of a detailed layout of network topology 100 and in particular show the entities involved in the process for the SaaS server 120 to grant access to the subject 109 of the client device 110. In FIG. 4A, the subject 109 interacts with the client device 110 in order to communicate with the network access device 106. The network access device 106 communicates with an authentication, authorization and accounting (AAA) server 420 to authenticate and authorize the subject 109 of the client device 110. The network access device 106, for example, may be a switch device which implements network access control, in collaboration with the AAA server 420 and the Enterprise Directory 430, as well as being the attribute authority for network session data.

The network access device 106 also communicates with the session directory database 112, which is configured to store network identity information (e.g., the network session identifier 114) associated with the network access device 106 and identity and authorization information associated with the subject 109 of the client device 110, as well as information about the client device 110 and the network session. As described above, the session directory database 112 may be queried, for example, by the identity provider device 108 for information relating to the network session identifier information 114. FIG. 4A also shows an enterprise directory 430 that stores credentials and policy data that the AAA server 420 can access for authenticating the principals of the subject 109.

FIG. 4A shows the identity provider device 108 in communication with the session directory database 112 and also shows the identity boundary device 122 in communication with the network access device 106 and the identity provider device 108. The identity boundary device 122 may be, for example, a network relying party that is configured to query the identity provider device 108 (e.g., directly or indirectly via the client device 110 and the network access device 106) to obtain security assertions for verifying the authentication and authorization of the subject 109 of the client device 110. It should be appreciated that the identity provider device 108 may also be in direct communication with the network access device 106 and that the client device 110 may be in direct communication with the identity boundary device 122. The SaaS server 120 is shown in communication with the identity boundary device 122. In one example, the SaaS server 120 acts as an application relying party that controls the resources that the subject 109 of the client device 110 seeks to access. A network relying party may be a network device, for example a firewall device of the network that relies on the details of a network assertion, while an application relying party may be, for example, a web server that relies on the details of the network assertion.

Referring now to FIG. 4B, a variation of the network topology 100 shown in FIG. 4A is shown. In FIG. 4B, the identity boundary device 122 performs the same roles as the identity provider device 108. For example, the identity boundary device 122 in FIG. 4B is configured to query the session directory database 112 to obtain security assertions for verifying the authentication and authorization of the subject 109 of the client device 110. For simplicity, the communications between the network components in FIGS. 4A and 4B are described with the identity provider device 108 as a separate device from the identity boundary device 122, though it should be appreciated that the features described for the identity provider device 108 are also applicable to the alternate embodiment in FIG. 4B where the identity boundary device 122 acts as the identity provider device 108 (e.g., an inline identity provider device). The communications between the network entities in FIGS. 4A and 4B are now described in more detail, in reference to FIG. 5.

Figure 5:
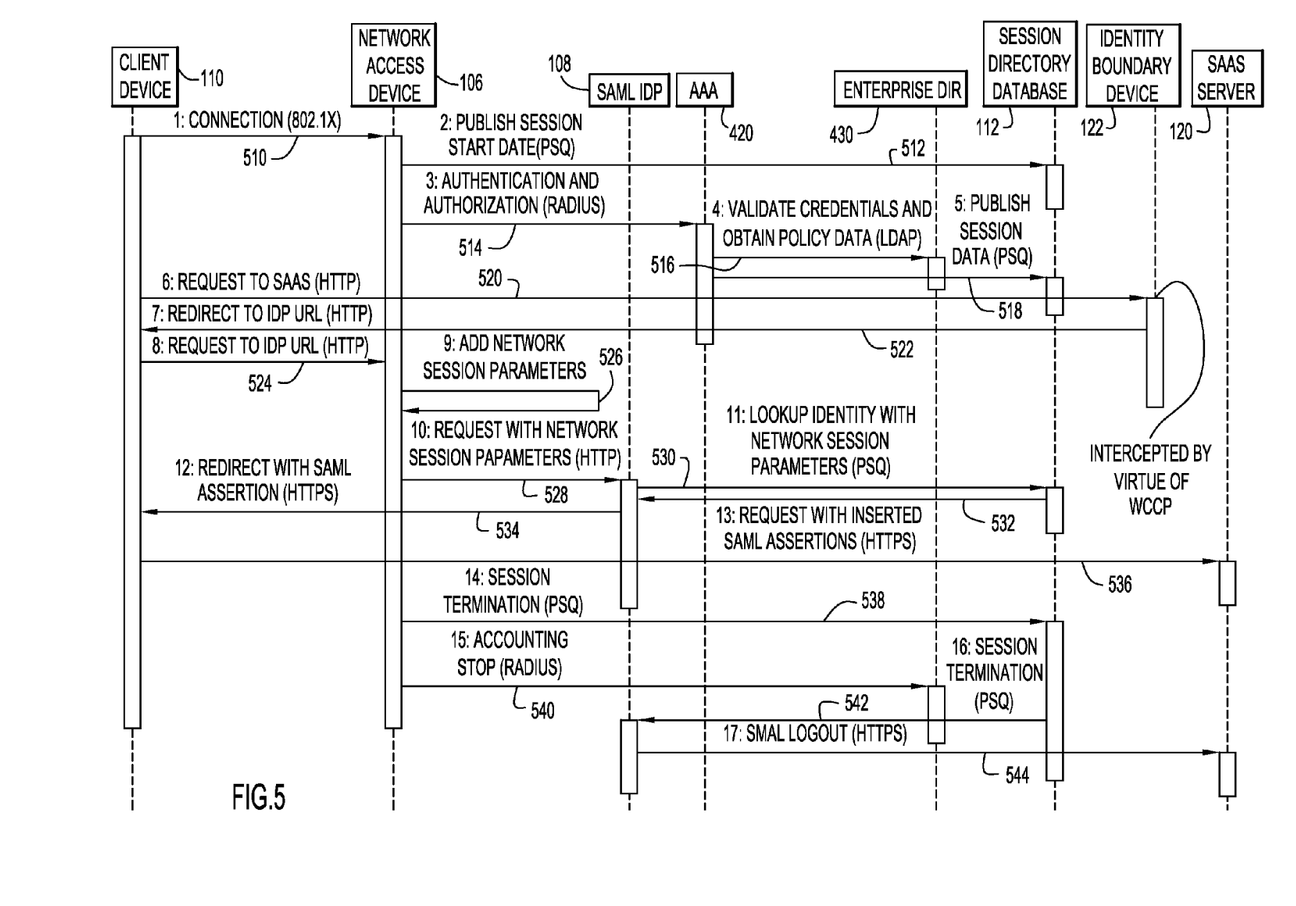
FIG. 5 is an example ladder diagram depicting a process for a network access device to provide the network session identifier information to the identity provider device for authentication verification of the subject.

FIG. 5 is an example ladder diagram depicting a process for the network access device 106 to provide the network session identifier information to the identity provider device 108 to verify authentication and authorization of the subject 109 (not shown in FIG. 5) of the client device 110 to allow the subject 109 to access the SaaS server 120 via the client device 110. In FIG. 5, the client device 110 (e.g., at the request of the subject 109) initiates a connection 510 to authenticate with the network access device 106. Connection 510 is also shown in FIGS. 4A and 4B between the client device 110 (e.g., a personal computer) and the network access device 106. The client device 110 may initiate a connection according to, for example, the Institute of Electrical and Electronic Engineers (IEEE) authentication standard 802.1X. The network access device 106 authenticates the subject 109 of the client device 110 by, for example, verifying a subject user name, also known as the subject's principal, and password entered by the subject 109 and associated with the client device 110. It should be appreciated, however, that any authentication standard may be used to authenticate the subject 109 of the client device 110, and the IEEE 802.1X authentication standard is only an example. The client device 110 may be a secure personal computer that is configured to connect to the enterprise network 102, described in FIG. 1. Additionally, connection 510 may be established, for example, such that devices only with known or permitted IP addresses or media access control (MAC) addresses are able to connect with the network access device 106.

After the subject 109 authenticates with the network access device 106 via the client device 110, the network access device 106 publishes session start data information at 512 to the session directory database 112. This operation is shown in FIGS. 4A and 4B between the network access device and the session directory database 112. As a part of operation 512, the network access device 106 stores the network session identifier 114 associated with the network session, established by client device 110 when client device 110 connected to network access device 106, in the session directory database 112. As stated above, the network session identifier 114 is a unique identifier that corresponds to the network session for client device 110 when connected to network access device 106. The network access device 106 may publish the session data at 512 according to a publish, subscribe and query (PSQ) protocol, remote authentication dial-in user service (RADIUS) protocol, or other suitable protocol for publishing session data. For example, the PSQ protocol may be any protocol that can be implemented using publish, subscribe and query exchange messages. The PSQ may support the ability for network devices to issue a query for principal information by using a network session identifier. The query aspect of the PSQ may be implemented using SAML.

After the network access device 106 publishes the session data at 512, the network access device, at 514 utilizes, for example, the RADIUS protocol to perform authentication, authorization and accounting operations at the AAA server 420 in order to authenticate the subject 109 of the client device 110. The operation depicted at 514 is shown in FIGS. 4A and 4B between the network access device 106 and the AAA server 420. For simplicity, FIG. 5 shows AAA operations being performed on a distinct standalone AAA server 420, though it should be appreciated that these operations may be performed by, for example, the identity provider device 108 or the enterprise directory 430 acting as a RADIUS server, or that a different protocol may be used between the access device 106 and any other system element that supports the same protocol for the purposes of authenticating the subject 109 of the client device 110.

As part of the process by which the subject 109 of the client device 110 is authenticated by AAA server 420, the AAA server 420, at 516, validates the principals of the subject 109, using credential data also supplied from subject 109 via client device 110, with the Enterprise Directory 430. For example, the AAA server 420 authenticates and authorizes access network access for the client device 110 using credential and policy attributes from the enterprise directory 430. In one example, the AAA server 420 authenticates and authorizes the subject 109 and the client device 110 with the enterprise directory 430 using a lightweight directory access protocol (LDAP) or other suitable protocol. It should be appreciated that though FIG. 5 depicts the enterprise directory 430 as validating the principals of the subject 109 of client device 110, any other system that can validate subject principals with credentials may be used. The validation operations shown at 516 are also depicted in FIGS. 4A and 4B between the AAA server 420 and the enterprise directory 430.

After the validation operations of 516 have been performed, the AAA server, at 518, publishes session data information to the session directory database 112, using, for example, PSQ, RADIUS, or other protocols. The session data may comprise information associated with the network session and the subject 109 of the client device 110, such as subject principal, client device IP address, client device MAC address, location connection and type, operating system of client device and other information known about the subject, client device and network session, as described above. In one example, the session data that is published/stored in the session directory database 112 is the same information shown at reference numeral 116 in FIG. 1, described above. This stored information can be retrieved by any network device (e.g., the identity provider device 108) that is aware of the network session identifier 114. In other words, the network session identifier 114 can be used as a key to access other information associated with the identifier, so long as a network device has access to this key.

After the session data is published to the session directory database 112, the client device 110 sends a request 520 for access to the SaaS server 120 that is routed directly or indirectly, using, e.g., the Web Cache Control Protocol (WCCP) or similar routing mechanism, to the to the identity boundary device 122. The identity boundary device 122 may receive the request 520 directly from the client device 110, or may receive the request 520 by intercepting a request that is intended for the SaaS server 120, by virtue of, e.g., WCCP as described above. In one example, the request 520 may be a request by the client device 110 for the subject 109 to access a SaaS website that is a service provider acting as an application relying party. If the identity boundary device 122 is, directly or indirectly, in a data path between the client device 110 and the SaaS server 120, the identity boundary device 122 will intercept the request when the request is of a form or content that the identity boundary device has been configured to recognize as one that is destined for a SaaS server that requires an identity assertion. The identity boundary device 122 may be any device that supports the functionality to identify specific uniform resource locators (URLs), or other network protocol specific addressing mechanisms, and cause a redirect, if needed, in response to receiving a request that is destined for a SaaS that requires an identity assertion, as described above. It should be appreciated that the client device initiates the request 520 (e.g., communications with the identity boundary device 122) via the network access device 106 (as shown in FIGS. 4A and 4B).

After the identity boundary device 122 receives the request 520 from the client device 110, the identity boundary device sends a redirect 522 to the client device 110 for the subject 109, or any agent software on the client device that acts on the subject's behalf to communicate with the identity provider device 108, e.g. a web browser, XMPP client or similar such software agents. For example, when the identity boundary device 122 receives an HTTP request from the client device 110, the identity boundary device 522 redirects the web browser of the client device to a URL associated with the identity provider device 108. The redirect 522 is also shown in FIG. 4A between the identity boundary device 122 and the identity provider device 108.

After the request 520 from the client device 110 is redirected to the URL associated with the identity provider device 108, as shown by 522, the client device 110 initiates a request 524 (e.g., an HTTP request directed to the URL associated with the identity provider device 108) to access the identity provider device 108. The network access device 106, by virtue of residing in the data path between the client device 110 and the identity provider device 108, and because the network access device has been configured to recognize requests to the identity provider device, intercepts the request 524, and at 526, inserts network session parameters, headers or other network protocol specific mechanisms, to the request 524. For example, the network access device 106 is configured to recognize that the request 524 contains a URL directed to the identity provider device 108, and upon such recognition, transparently appends the network session identifier 114 as a parameter to the HTTP request 524 from the client device 110 to the identity provider device 108. The network session identifier 114, as stated above, is a unique identifier that identifies the network session for the client device 110 on the network access device 106, and accordingly, identifies subjects (e.g., subject 109) and associated client devices (e.g., client device 110) that have authenticated and authorized to access the network 100 via the network access device 106. It should be appreciated that the network session identifier 114 is only available to the network access device 106 and that the network session identifier 114 is never revealed to the subject 109 of the client device 110. The client device, then, is not in a position to reuse the network session identifier 114 for any other purpose, nor can the network session identifier 114 be intercepted in the data path between the client device 110 and the network access device 106 by a third party that might wish to use the network session identifier 114 for any other purpose.

After the network session parameters are added at 526, the request 524 with the added network session parameters is sent, at 528, to the identity provider device 108. The identity provider device 108 parses the request 528 and obtains the network session parameters that were added to the request 524. For example, the identity provider device 108 is configured to parse an HTTP request to obtain the network session identifier 114. Thus, the network session identifier 114, which was previously known only to the network access device 106, is now known to the identity provider device 108. Armed with this information, the identity provider device 108, at 530, queries the session directory database 122 to obtain information associated with the network session identifier 114. It should be appreciated that the data path between the network access device 106 and the identity appliance 108 is considered to be secure and or protected such that third parties will not have access to the network traffic on that data path, and so will not be able to intercept the network session identifier 114 and use it for any other purpose.

For example, the identity provider device 108 sends, at 530 the network session identifier query (depicted as reference numeral 118 in FIG. 1), to the session directory database 112 to retrieve authentication, and, in general network session context, information of the subject and client device associated with the network access device 106 that corresponds to the network session identifier. In one example, the identity provider device 108 sends a query (e.g., using a PSQ, RADIUS or other protocol supporting queries) containing the network session identifier 114 to the session directory database 112.

At 532, the session directory database returns to the identity provider device 108 information pertaining to all of the authorized client devices (e.g., client device 110) associated with the network access device 106 that corresponds to the network session identifier 114. The identity provider device 108 searches this received information to verify that the subject 109 of the client device 110 has authenticated with the network access device 106. If the subject 109 of the client device 110 has authenticated with the network access device 106, the identity provider device 108 generates a signed assertion and, at 534, sends the signed assertion to the agent software representing the subject 109 running on the client device 110 using, for example, an HTTP secure (HTTPS) protocol, in a request destined for the SaaS server that was the target of the request in 520. The redirected request at 534 will not contain the network session identifier 114 as the network session identifier 114 will not be included by the identity provider device 108. The redirected request at 534 may be to a different URL, or other network protocol specific address, for the SaaS server 120 than the request in 520. It should be appreciated that the SaaS server 120 may have logical subdivisions and that one such subdivision may be designated as the logical target of an identity assertion.

In one example, the signed assertion is a security assertion markup language (SAML) assertion. In this example, the identity provider device 108 may create the SAML assertion and may encode within the SAML assertion the mechanism of authentication. The SAML assertion is encrypted and signed by a certificate that has been shared between the identity provider device 108 and the SaaS server 120. The shared certificate allows the SaaS server 120 to know that the assertion of identity has been created by the identity provider device, and that the assertion has not been changed during transmission to the SaaS server 120. The assertion, may also contain data about the authentication mechanism used to verify the identity at network access device 106. The data about the authentication mechanism used to access the network 100 may be used by the SaaS server 120 to determine a level of assurance about the identity, which determines the degree to which the SaaS server 120 can rely on the identity asserted. For example, different SaaS servers 120 may require different levels of assurance about the identity, and hence different mechanisms for verifying identity, for different sets of data or services. In one case a SaaS server 120 may accept identity established by providing a reusable password from the subject 109, whilst in another case the SaaS server 120 may require that the subject use a one-time password created by a system that is outside the scope of this invention.

SAML is a protocol for exchanging assertions about authentication and attributes associated with a subject. The SAML assertion is signed by a certificate shared between the provider of the assertion, e.g. the identity provider device 108, and the SaaS relying party, e.g. the SaaS server 120. The use of the certificate allows the SaaS server 120 to establish a trust relationship with the identity provider device 108, which allows the SaaS server 120 to rely upon the identity provider device 108 assertions as being true. For example, if the identity provider device 108 indicates (e.g., via the SAML assertion) that the subject 109 of the principal 110 has been authenticated, the SaaS server 120 will grant the subject 109 of the principal 110 access, with appropriate controls based on the status of the subject. It should be appreciated that though SAML assertions are depicted in FIG. 5, any signed assertion can be generated and sent to the client device 110 by the identity provider device 108.

After the client device 110 receives the SAML assertion from the identity provider device 108, the subject 109, via the client device 110, sends a request 536 to the SaaS server with the inserted SAML assertion. This request (e.g., an HTTPS request) may be sent directly to the SaaS server 120, to the SaaS server 120 via the identity boundary device 122, or to the SaaS server 120 via the network access device 106 and the identity boundary device 122, or via other routed or switched paths. For example, the identity boundary device 122 may be configured to repackage the SAML assertion received by the principal 110 to enable the SaaS server 120 to grant access to the subject 109 of the client device 110. Upon receiving the request 536, the SaaS server 120, as an application relying party, uses the attributes in the SAML assertion to determine which policies and services to apply and grant access for the subject 109 of the client device 110.

When the client device 110 terminates its network session the network access device 106 (e.g., when the subject 109 of the principal 110 logs off the enterprise network 102), the network access device initiates a session termination 538 with the session directory database 112 and an optional accounting stop 540 with the enterprise directory 430 if RADIUS accounting is employed. At 542, the session directory database sends a session termination to the identity provider device 108, and accordingly, the identity provider device 108 initiates, at 544, a SAML log out with the SaaS server 120.

Figure 6:
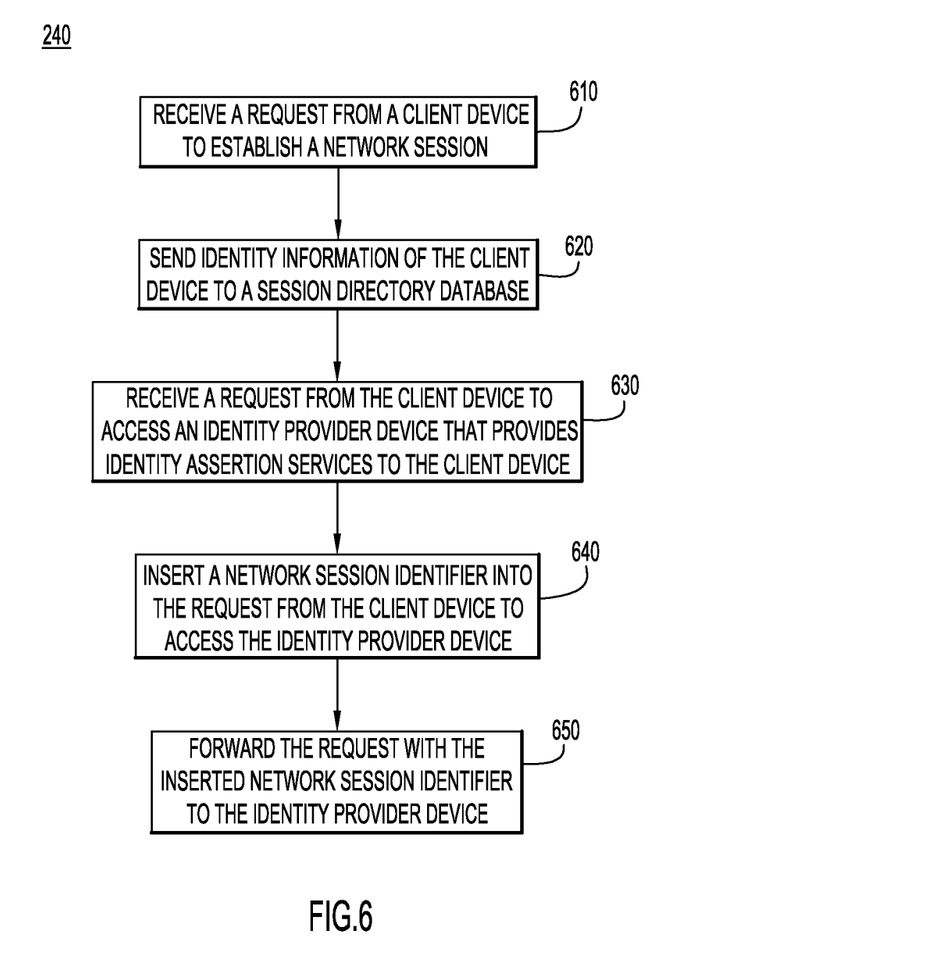
FIG. 6 is an example flow chart depicting operations of the network session identifier insertion process logic to provide network session identifier information to the identity provider device.

Reference is now made to FIG. 6, which shows an example flow chart depicting operations of the network session identifier insertion process logic 240. At 610, the network access device 106 receives a request from the client device 110 to start a network session. After receiving the request, the network access device 106 sends, at 620, identity information of the client device 110 to the session directory database 112. The network access device then authenticates the subject 109 of client device 110 and updates the session directory 112 with the subject's identity data, as well as any other data available pertaining to the subject 109, client device 110 or network session. At 630, a request is received from the subject 109, or software agents running on the subject's 109 behalf, on the client device 110 to access the identity provider device 108 that provides identity assertion services (e.g., a signed assertion to verify that the principal of the subject 109 have been authenticated) to the subject 109, or software agents running on the subject's behalf, on the client device 110. At 640, the network session identifier 114 is inserted by the network access device 106 into the request from the subject 109 of the client device 110 to access the identity provider device 108. After the network session identifier 114 is inserted by the network access device 106, at 650, the request to access the identity provider device 108 is forwarded with the inserted network session identifier 114 to the identity provider device 108.

Figure 7:
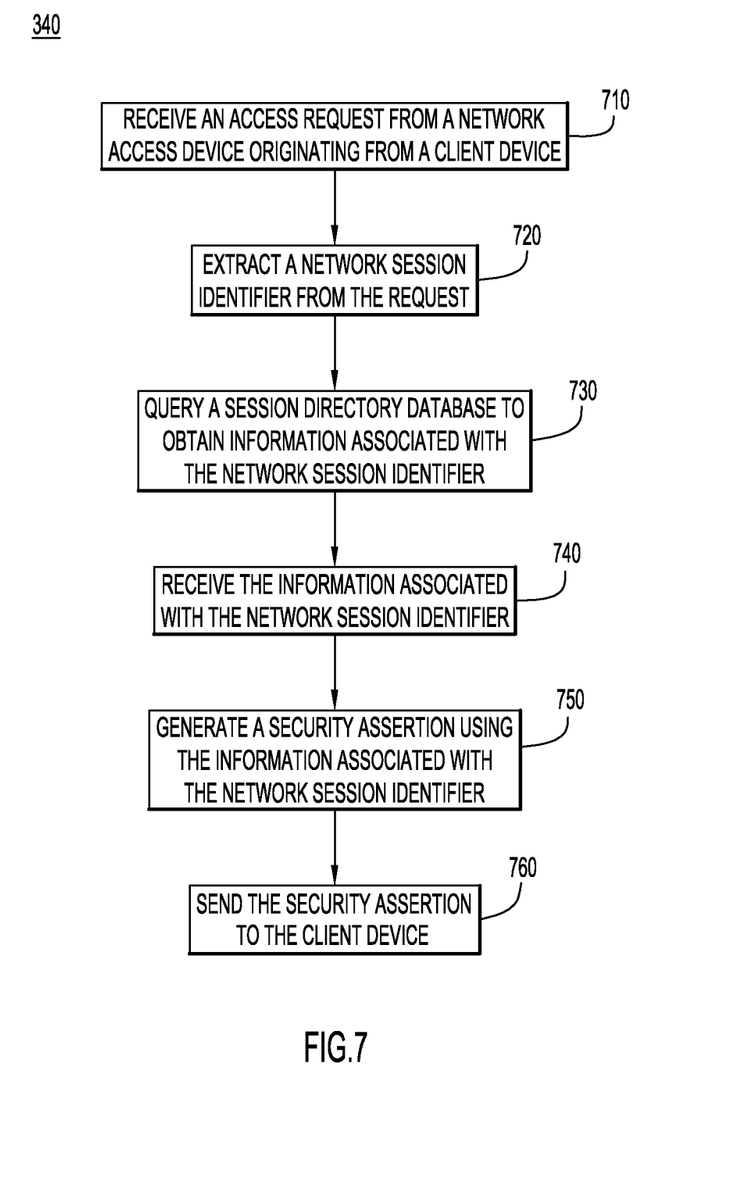
FIG. 7 is an example flow chart depicting operations for the network session identifier extraction and query process logic to utilize the network session information to verify authentication of the network session subject.

Reference is now made to FIG. 7, which shows an example flow chart depicting operations for the network session identifier extraction and query process logic 340. At 710, the identity provider device 108 receives a request from the network access device 106. The access request originates, for example, from the subject 109 of the client device 110. At 720, the network session identifier 114 is extracted from the request, and at 730, the session directory database 112 is queried to obtain information associated with the network session identifier 114. At 740, information associated with the network session identifier 114 is received by the identity provider device 108, and after receiving the information, the identity provider device 108, at 750, generates a security assertion using the information. At 760, the identity provider device 108 sends the security assertion to the subject 109 of the client device 110.

It should be appreciated that the techniques described above in connection with all embodiments may be performed by one or more computer readable storage media that is encoded with software comprising computer executable instructions to perform the methods and steps described herein.

In sum, a method is provided comprising: at a network access device of a network, receiving a request from a client device to establish a network session; sending identity information of the client device to a session directory database that is configured to store identity information of a plurality of client devices associated with the network access device; receiving a request from the client device to access an identity provider device that provides identity assertion services to the client device; inserting a network session identifier into the request from the client device to access the identity provider device, wherein the network session identifier is a unique identifier that identifies the network; and forwarding the request with the inserted network session identifier to the identity provider device.

In addition, a method is provided comprising: at an identity provider device in a network that provides identity assertion services, receiving a request from a network access device originating from a client device to access the identity provider device; extracting a network session identifier from the request, wherein the network session identifier is unique to the network; querying a session directory database to obtain information associated with the network session identifier; receiving the information associated with the network session identifier from the session directory database; generating a security assertion using the information associated with the network session identifier; and sending the security assertion to the client device.

Furthermore, one or more computer readable storage media is provided that is encoded with software comprising computer executable instructions and when the software is executed operable to: receive a request from a client device in a network to establish a network session; send identity information of the client device to a session directory database that is configured to store identity information of a plurality of client devices associated with the network access device; receive a request from the client device to access an identity provider device that provides identity assertion services to the client device; insert a network session identifier into the request from the client device to access the identity provider device, wherein the network session identifier is a unique identifier that identifies a network; and forward the request with the inserted network session identifier to the identity provider device.

In addition, one or more computer readable storage media is provided that is encoded with software comprising computer executable instructions and when the software is executed operable to: receive an access request from a network access device originating from a client device in a network to access an identity provider device; extract a network session identifier from the request, wherein the network session identifier is unique to the network; query a session directory database to obtain information associated with the network session identifier; receive the information associated with the network session identifier from the session directory; generate a security assertion using the information associated with the network session identifier; and send the security assertion to the client device.

Furthermore, an apparatus is provided comprising: a network interface unit configured to enable communications over a network; a switch unit coupled to the network interface unit; a memory; and a processor coupled to the switch unit and the memory and configured to: receive a request from a client device to establish a network session; send identity information of the client device to a session directory database that is configured to store identity information of a plurality of client devices; receive a request from the client device to access an identity provider device that provides identity assertion services to the client device; insert a network session identifier into the request from the client device to access the identity provider device, wherein the network session identifier is a unique identifier; and forward the request with the inserted network session identifier to the identity provider device.

Additionally, an apparatus is provided comprising: a network interface unit configured to enable communications over a network; a memory; and a processor coupled to the network interface unit and the memory and configured to: receive a request from a network access device originating from a client device; extract a network session identifier from the request, wherein the network session identifier is unique to the network; query a session directory database to obtain information associated with the network session identifier; receive the information associated with the network session identifier from the session directory; generate a security assertion using the information associated with the network session identifier; and send the security assertion to the client device.

The above description is intended by way of example only. Various modifications and structural changes may be made therein without departing from the scope of the concepts described herein and within the scope and range of equivalents of the claims.

What is claimed is:

1. A method comprising:
  at a network access device of a network, receiving a request from a client device to establish a network session to access a server;
  sending identity information of the client device to a session directory database that is configured to store identity information of a plurality of client devices associated with the network access device;
  receiving a request from the client device to access an identity provider device that provides identity assertion services to the client device, wherein the identity assertion services include identity and context information associated with a subject of the client device;
  obtaining from the session directory database a unique network session identifier that identifies a network session and the subject of the client device that has authenticated with the network access device to access the network session;
  inserting the network session identifier into the request from the client device to access the identity provider device such that the network session identifier is available only to the identity provider device and the network session identifier is not revealed to the subject of the client device; and
  forwarding the request with the inserted network session identifier to the identity provider device, wherein the identity provider device generates an encrypted security assertion of an identity of a user associated with the network session, where the encrypted security assertion is signed using a certificate shared by the identity provider device and the server, and the identity provider device forwards the encrypted security assertion to the client device for insertion into a request from the client device to access the server.

2. The method of claim 1, further comprising:
  authenticating the subject of the client device to obtain authentication information associated with the subject of the client device; and
  sending the authentication information associated with the subject of the client device to the session directory.

3. The method of claim 1, wherein receiving a request comprises receiving a uniform resource locator (URL) request from the client device to access the identity provider device.

4. The method of claim 3, wherein receiving the URL request comprises receiving the URL request as a result of a redirect from an identity boundary device in response to a client device requesting access to application services outside of the enterprise network.

5. The method of claim 3, wherein inserting comprises inserting the network session identifier information to a hypertext transfer protocol (HTTP) header of the URL request.

6. The method of claim 1, wherein inserting comprises inserting the network session identifier that comprises a pseudorandom number that is unique to the network.

7. The method of claim 1, wherein receiving comprises receiving the request originating from a subject of the client device to access the identity provider device.

8. A method comprising:
  at an identity provider device in a network that provides identity assertion services, receiving a request, from a network access device originating from a client device seeking to access a server, to access the identity provider device, wherein the identity assertion services include identity and context information associated with a subject of the client device;
  extracting a network session identifier from the request, wherein the network session identifier is unique to the network access device and uniquely identifies a network session for the subject of the client device that has authenticated with the network access device;
  querying a session directory database to obtain information associated with the network session identifier;
  receiving from the session directory database the information associated with the network session identifier that uniquely identifies the subject;
  generating an encrypted security assertion of an identity of a user associated with the network session, using the information associated with the network session identifier, wherein the encrypted security assertion is signed using a certificate shared by the identity provider device and the server; and
  sending the encrypted security assertion to the client device.

9. The method of claim 8, wherein the request comprises a uniform resource locator (URL) request from the network access device originating from the client device for the client device to access the identity provider device.

10. The method of claim 9, wherein extracting comprises extracting the network session identifier from a hypertext transfer protocol (HTTP) header of the URL request.

11. The method of claim 9, wherein generating comprises generating a security assertion markup language (SAML) assertion.

12. One or more non-transitory computer readable storage media encoded with software comprising computer executable instructions and when the software is executed operable to:
  receive a request from a client device in a network to establish a network session to request access to a server;
  send identity information of the client device to a session directory database that is configured to store identity information of a plurality of client devices associated with the network access device;
  receive a request from the client device to access an identity provider device that provides identity assertion services to the client device, wherein the identity assertion services include identity and context information associated with a subject of the client device;
  obtain from the session directory database a unique network session identifier that identifies a network session and the subject of the client device that has authenticated with the network access device to access the network session;
  insert the network session identifier into the request from the client device to access the identity provider device such that the network session identifier is available only to the identity provider device and the network session identifier is not revealed to the subject of the client device; and forward the request with the inserted network session identifier to the identity provider device, wherein the identity provider device generates an encrypted security assertion of an identity of a user associated with the network session, where the encrypted security assertion is signed using a certificate shared by the identity provider device and the server, and the identity provider device forwards the encrypted security assertion to the client device for insertion into a request from the client device to access the server.

13. The computer readable storage media of claim 12, further comprising instructions operable to:

authenticate subject of the client device to obtain authentication information associated with the subject of the client device; and send the authentication information associated with the subject of the client device to the session directory.

14. One or more non-transitory computer readable storage media encoded with software comprising computer executable instructions and when the software is executed operable to:

receive an access request, from a network access device and originating from a client device seeking to access a server, to access an identity provider device, wherein the identity provider device provides identity assertion services which include identity and context information associated with a subject of the client device;

extract a network session identifier from the request, wherein the network session identifier is unique to the network access device and uniquely identifies a network session for the subject of the client device that has authenticated with the network access device;

query a session directory database to obtain information associated with the network session identifier;

receive from the session directory database the information associated with the network session identifier from the session directory;

generate an encrypted security assertion of an identity of a user associated with the network session, using the information associated with the network session identifier, wherein the encrypted security assertion is signed using a certificate shared by the identity provider device and the server; and send the encrypted security assertion to the client device.

15. The computer readable storage media of claim 14, further comprising instructions operable to determine after receiving the request from the network access device whether the request contains network session identifier information to be extracted from the request.

16. An apparatus comprising:

a network interface unit configured to enable communications over a network;

a switch unit coupled to the network interface unit;

a memory; and a processor coupled to the switch unit and the memory and configured to:

receive a request from a client device to establish a network session to access a server;

send identity information of the client device to a session directory database that is configured to store identity information of a plurality of client devices;

receive a request from the client device to access an identity provider device that provides identity assertion services to the client device, wherein the identity assertion services include identity and context information associated with a subject of the client device;

obtain from the session directory database a unique network session identifier that identifies a network session and identifies the subject of the client device that has authenticated with the network access device to access the network session;

insert the network session identifier into the request from the client device to access the identity provider device such that the network session identifier is available only to the identity provider device and the network session identifier is not revealed to the subject of the client device; and forward the request with the inserted network session identifier to the identity provider device to cause the identity provider device to generate an encrypted security assertion of an identity of a user associated with the network session, where the encrypted security assertion is signed using a certificate shared by the identity provider device and the server, and the identity provider device forwards the encrypted security assertion to the client device for insertion into a request from the client device to access the server.

17. The apparatus of claim 16, wherein the processor is further configured to:

authenticate the subject of the client device to obtain authentication information associated with the subject of the client device; and send the authentication information associated with the subject of the client device to the session directory.

18. An apparatus comprising:

a network interface unit configured to enable communications over a network;

a memory; and a processor coupled to the network interface unit and the memory and configured to:

receive a request from a network access device, originating from a client device seeking to access a server;

extract a network session identifier from the request, wherein the network session identifier is unique to the network access device and uniquely identifies a network session for the subject of the client device that has authenticated with the network access device;

query a session directory database to obtain information associated with the network session identifier;

receive from the session directory database the information associated with the network session identifier from the session directory;

generate an encrypted security assertion of an identity of a user associated with the network session, using the information associated with the network session identifier wherein the encrypted security assertion is signed using a certificate shared by the identity provider device and the server; and send the encrypted security assertion to the client device.

19. The apparatus of claim 18, wherein the processor is further configured to determine, after receiving the request from the network access device, whether the request contains network session identifier information to be extracted from the request.

* * * * *